United States Patent [19]

Ootsuka

[11] Patent Number: 4,476,570
[45] Date of Patent: Oct. 9, 1984

[54] DATA PROCESSING APPARATUS WITH COMBINED VOICE SOUND REPRODUCING DEVICE AND VISUAL DISPLAY

[75] Inventor: Tetsuo Ootsuka, Tokyo, Japan

[73] Assignee: Casio Computer Co., Tokyo, Japan

[21] Appl. No.: 525,253

[22] Filed: Aug. 19, 1983

Related U.S. Application Data

[63] Continuation of Ser. No. 253,037, Apr. 10, 1981.

[30] Foreign Application Priority Data

May 12, 1980 [JP] Japan .................................. 55-62397

[51] Int. Cl.³ ............................................... G10L 1/00
[52] U.S. Cl. .................................. 381/51; 364/513.5; 377/13
[58] Field of Search ............................. 381/51, 87–90; 239/92 AC; 364/709, 710, 725, 405; 340/378.5, 378.6

[56] References Cited

U.S. PATENT DOCUMENTS

| 3,330,947 | 7/1967 | Alpert et al. | 235/92 AC |
| 3,526,718 | 9/1970 | Beatty | 179/1 E |
| 4,185,170 | 1/1980 | Morino et al. | 179/1 SM |
| 4,216,461 | 8/1980 | Werth | 235/92 AC |
| 4,369,334 | 1/1983 | Nakatani et al. | 364/405 |

Primary Examiner—E. S. Matt Kemeny
Attorney, Agent, or Firm—Frishauf, Holtz, Goodman & Woodward

[57] ABSTRACT

A voice sound producing electronic data processing apparatus has an electronic data processing main body, a visual display device and a voice sound outputting device having at least one loudspeaker. The voice sound outputting device is coupled to the display device and both are rotatably supported on the electronic data processing main body through a support part having a rotating mechanism such that the loudspeaker and the display device always face in the same direction.

6 Claims, 5 Drawing Figures

DATA PROCESSING APPARATUS WITH COMBINED VOICE SOUND REPRODUCING DEVICE AND VISUAL DISPLAY

This application is a continuation, of application Ser. No. 253,037, filed Apr. 10, 1981.

BACKGROUND OF THE INVENTION

The present invention relates to an improvement in an electronic data processing apparatus which produces a voice sound and which has a visual display.

An electronic data processing apparatus, such as an electronic cash register, which reproduces as a voice sound numerical data input by key operation, is known. However, the orientation of the loudspeaker is stationary in an electronic cash register of the known type. Therefore, when a plurality of such electronic cash registers are arranged together at the cashier's counter in a super market or the like, the sounds from the loudspeakers tend to interfere with each other, making it difficult to differentiate between them. Furthermore, depending on the design of the store or sales department, the orientation of the loudspeaker of the electronic cash register is fixed in only one direction and does not orient toward a cashier or a customer, resulting in a disadvantage in that the sounds from the loudspeakers are hard to hear from other directions.

The principal object of the present invention is to provide a voice sound producing electronic data processing apparatus in which a loudspeaker can face freely in any direction and a display device can face in the same direction as the loudspeaker, whereby voice sounds may be accurately transmitted in a desired direction and a display can be seen from the same direction.

SUMMARY OF THE INVENTION

According to the present invention, a voice sound producing electronic data processing apparatus comprises an electronic data processing apparatus main body which includes a keyboard and a central processing unit coupled to the keyboard; and an output means. The output means includes a display device having a visual display surface means; means for displaying on the visual display surface means input data keyed in from the keyboard and operation result data resulting from an arithmetic operation performed by the central processing unit; a voice sound outputting device integrally coupled to the visual display surface means and having a loudspeaker which faces in the same direction as the visual display surface means; and means coupled to the loudspeaker for generating the input data and operation result data as a voice sound from the loudspeaker. Further provided is supporting means coupled to the electronic data processing main body and including a rotating means and the loudspeaker of the output means on the electronic data processing apparatus main body such that the visual display surface means and the loudspeaker are rotatable together so as to always face in the same direction.

With this construction, in the electronic device (such an an electronic cash register) of the present invention, said voice sound outputting device and display device may be freely and easily directed in the same direction to face the cashier or to face a customer to facilitate hearing the sound from the loudspeaker and at the same time reading the display, independently of the limitations imposed by the location of the electronic device in the store or sales department.

This invention can be more fully understood from the following detailed description when taken in conjunction with the accompanying drawings:

DETAILED DESCRIPTION

Figure 1:
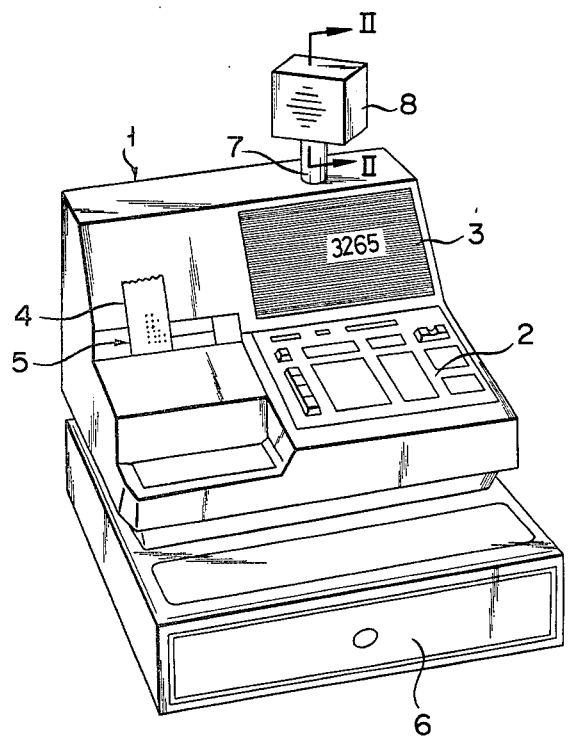
FIG. 1 is a perspective view illustrating the outer appearance of an electronic cash register according to the present invention.

An embodiment of the present invention will now be described with reference to FIGS. 1 to 3. FIG. 1 is a perspective view illustrating the outer appearance of an electronic cash register. Referring to FIG. 1 reference numeral 1 denotes an electronic cash register main body which has an input part 2 having various keys (an amount key, department keys, a subtotal key, a cash-/deposit received key, and mode switches for setting the respective modes of "register (REG)", "refund (REF)", "setting (SET)", "checking (X)", and "settlement (Z)"); a display part 3 for displaying various data; a feeding part 5 for feeding out a receipt 4 on which are printed various data; and a cash box 6 for storing cash.

A support column 7 stands upright at the top part of the electronic cash register main body 1. This support column 7 has a tubular shape and houses wire materials such as cords. A speaker box 8 is rotatably supported at the top part of the support column 7. The rotary mechanism of the speaker box 8 is so constructed that the speaker box 8 may be freely rotated (through 360 or 180°) in the horizontal plane. The orientation of the speaker box 8 may be varied by the support column 7, the speaker box 8, and the rotary mechanism.

Figure 2:
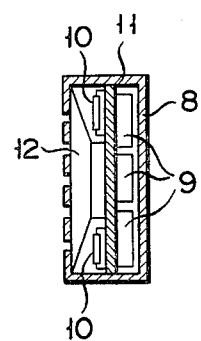
FIG. 2 is a sectional view along the line II—II of the voice sound outputting device shown in FIG. 1.
Figure 3:
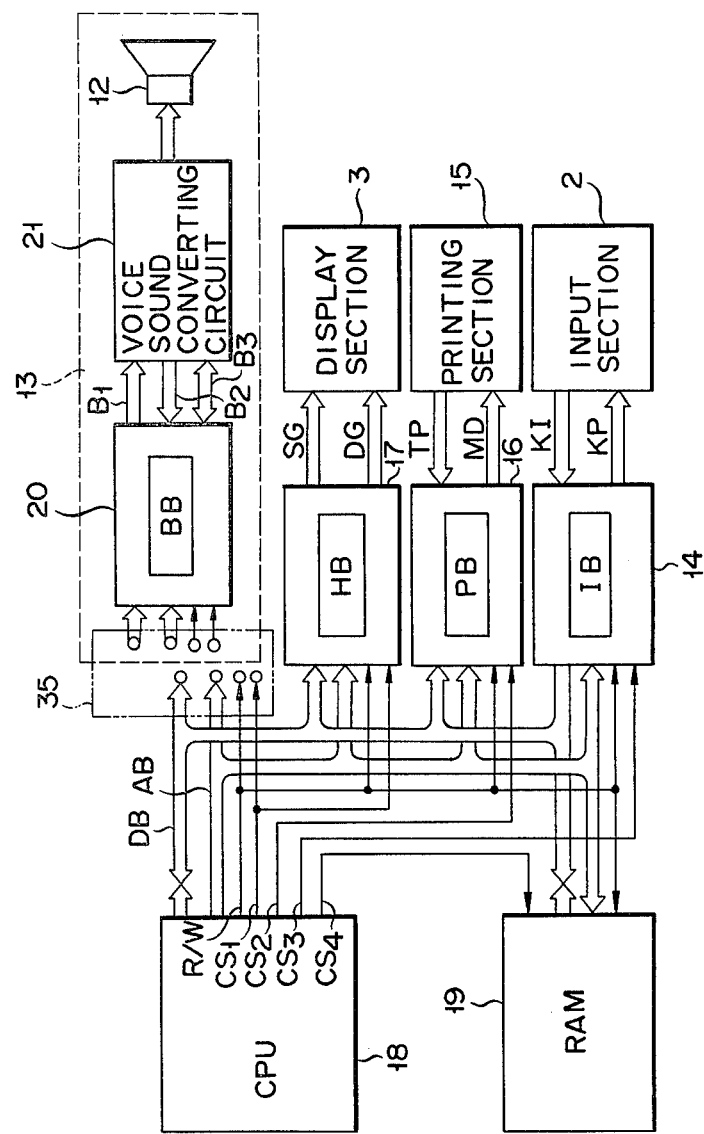
FIG. 3 is a view illustrating the system construction of the electronic cash register shown in FIG. 1.

As shown in FIG. 2, the speaker box 8 incorporates a circuit board 11 having electronic parts such as an LSI 9, resistor 10, and so on; and a loudspeaker 12 for producing a voice sound. This circuit board 11 and the loudspeaker 12 constitute a voice sound outputting circuit 13 to be described hereinafter.

The system construction of the electronic cash register will be described next, referring to FIG. 3. In FIG. 3, reference numeral 2 denotes the input part having the various operation keys described hereinabove. To this input part 2 from an input control part 14 is supplied a timing signal KP for sampling. When the key operation is performed, the timing signal KP is selected according to the operated key and is input as a key input signal KI to an input buffer IB disposed at the input control part 14.

A printing part 15 supplies to a printing control part 16 a printing position signal TP of a printing drum (not shown). The printing control part 16 sends to the printing part 15 a printing drive signal MD, generated by correspondence between the input data and the data within a printing buffer PB, for printing amount data and the like on a journal paper sheet or a receipt paper sheet.

To the display part 3 described above are supplied a digit signal DG from a display control part 17 and a segment signal SG obtained by decoding the data of a display buffer HB incorporated therein, and the display part 3 displays the amount data and the like according to these signals.

To these control parts 14, 16 and 17 are connected a CPU 18 and a RAM (random access memory) 19 through an address bus line AB and a data bus line DB. The RAM 19 stores the sales data for each department and transaction as classified. The CPU 18 outputs chip specifying signals CS1, CS2, CS3 and CS4 to the control parts 14, 16 and 17 and the RAM 19, respectively. The CPU 18 also outputs an R/W signal commonly to the control parts 14, 16, 17 and the RAM 19 for exchange of data between them and the CPU. The chip specifying signal CS3 and R/W signal are input to the voice sound outputting circuit 13 through a coupling part 35.

The voice sound outputting circuit 13 described hereinabove is detachably connected through the coupling part 35 to the address bus line AB and the data bus line DB, and may receive the R/W signal and the chip specifying signal CS3. The voice sound outputting circuit 13 comprises a voice sound control part 20, a voice sound converting circuit 21, and the loudspeaker 12 described hereinabove. When data is written in a voice buffer BB of the voice sound control part 20, exchange of data is performed between the voice and sound control part 20 and the voice sound converting circuit 21 through bus lines B1, B2 and B3 for converting the data supplied to the voice sound converting circuit 21 to voice sound data and outputting it to the loudspeaker 12.

The parts of the system described above, except for the voice sound outputting circuit 13, are arranged in the electronic cash register main body 1.

With an electronic cash register of the construction as described above, upon operation of the operation keys of the input part 2, the data corresponding to the operated keys (e.g., 3,265 yen) is displayed at the display part 3 as "3265 yen". Simultaneously with this, a voice sound of "three thousand two hundred sixty five yen" is produced from the loudspeaker 12 through the voice sound control part 20 and the voice sound converting circuit 21. In this case, the data corresponding to the operated keys (3265 yen) is printed on the receipt paper sheet at the printing part 15 and is fed out from the feeding part 5.

When the voice is being produced from the loudspeaker 12 and the customer is at the left side of the electronic cash register, for example, the loudspeaker box 8 can be rotated through a predetermined angle to orient the loudspeaker 12 toward the customer. Thus, the voice sound from the loudspeaker 12 is directed toward the customer. Accordingly, even when a plurality of electronic cash registers are arranged in the same area, the customer is able to hear the voice of the electronic cash register registering his purchases clearly and without confusion with other electronic cash registers.

Figure 4:
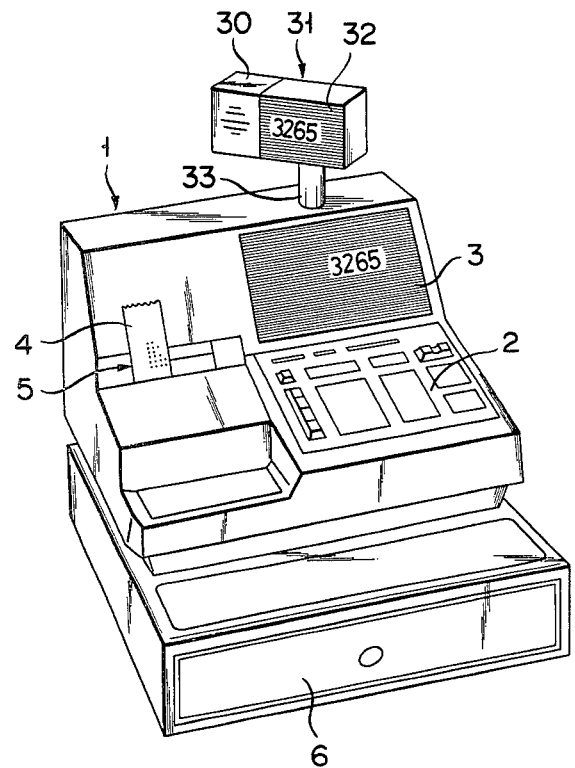
FIG. 4 is a perspective view illustrating an electronic device which is different from that shown in FIG. 1.
Figure 5:
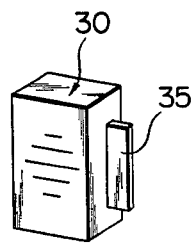
FIG. 5 is a perspective view illustrating the outer appearance of the speaker box which is the voice sound outputting device shown in FIG. 4.

Another embodiment of the present invention will now be described with reference to FIGS. 4 and 5. In this embodiment, a speaker box 30 and a rotary display 31 are formed integrally, and the other parts are of the same construction as in the above embodiment. A display part 32 of the rotary display 31 and the display part 3 of the electronic cash register main body 1 are electrically connected through connecting wires, and the data displayed at the display part 3 is simultaneously displayed at the display part 32 of the rotary display 31. The rotary display 31 is so constructed that it is rotatable on a support column 33 standing upright at the top part of the electronic cash register main body 1.

The speaker box 30 incorporates the circuit board and the loudspeaker (of the same construction as the former embodiment) which constitute the voice sound outputting circuit, of the same construction as in the former embodiment. This speaker box 30 includes the coupling part 35 for being detachably mounted to the rotary display 31. This coupling part 35 mechanically couples the speaker box 30 to the rotary display 31, and also electrically couples terminals of the voice sound control part of the voice sound outputting circuit to the output terminal of the electronic cash register main body 1 (terminals for outputting to the voice sound control part). In this case, the coupling part 35 is constructed to project, and a recessed coupling part (not shown) is included at the rotary display 31.

With the electronic cash register of this construction, the same function as that of the embodiment described hereinabove may be obtained. In addition, since the speaker box 30 is detachably constructed, inspection and maintenance thereof are simplified. Furthermore, since the coupling means between the speaker box 30 and the rotary display 31 are coupling parts of projecting and recessed types, the detaching operation is simplified. Furthermore, since the rotary display 31 is used as a means of varying the orientation of the speaker box 30, it is possible to attract the attention of the customer by the voice sound from the speaker box 30 to confirm the display at the display part 32 of the rotary display 31, in the electronic cash register of the above embodiment. As a result, the cashier makes fewer errors in the operation of the keys and is able to operate the cash register smoothly.

Although the speaker box was detachably mounted to the rotary mounted display in the above embodiments, the display may be mounted to a rotary mounted speaker box. Furthermore it is not necessary to mount speaker box and display detachably with respect to each other, but the speaker box and the display may be formed integrally. It suffices that the speaker and display are rotatable relative to the electronic cash register main body.

Although the voice sound outputting circuit 13 was built in the speaker box 8 and 30 in the above embodiments, the present invention is not limited to this particular construction. For example, it is possible to dispose the loudspeaker alone in the speaker box, and the other parts in the electronic cash register main body 1.

The present invention is not limited to the electronic cash register of the above construction, but may be adapted to other electronic devices such as electronic musical instruments and electronic calculators.

What is claimed is:

1. A voice sound producing electronic data processing apparatus comprising in combination:
    a main body including a keyboard and a central processing unit coupled to said keyboard;
    a sub-body including a display device and a voice sound outputting device; said display device having a visual display surface and displaying input data keyed in from said keyboard and operation result data resulting from an arithmetic operation performed by said central processing unit; and said voice sound outputting device having a loudspeaker which is fixed with said display device such that said loudspeaker faces in the same direction as said visual display surface and means coupled to said loudspeaker and being responsive to said input data and operation result data for generating said input data and operation result data as respective voice sounds from said loudspeaker; and supporting means for rotatably supporting said sub-body on said main body, said supporting means including a supporting column provided on said main body.

2. The voice sound producing electronic data processing device according to claim 1, wherein said sub-body comprises a first body carrying said display device, and a second body which is detachably coupled to said first body, said second body carrying said voice sound outputting device, said visual display surface and said loudspeaker facing in the same direction when said first and second bodies are coupled together.

3. The voice sound producing electronic data processing device of claim 2, wherein said supporting column rotatably supports said first body on said main body, and second body is detachably coupled to said first body.

4. The voice sound producing electronic data processing device of claim 1, wherein said supporting column is fixedly mounted on said main body, and said sub-body is rotatably mounted to said supporting column.

5. The voice sound producing electronic data processing device according to claim 4, wherein said supporting column is an elongated upwardly extending column which extends sufficiently upward to support said sub-body above the uppermost surface portions of said main body.

6. The voice sound producing electronic data processing device according to claim 1, wherein said supporting column is an elongated upwardly extending column which extends sufficiently upward to support said sub-body above the uppermost surface portions of said main body.

* * * * *